United States Patent Office 2,759,446
Patented Aug. 21, 1956

2,759,446
BRAZING MIXTURE

Charles W. Ewing, Centerville, Ohio, assignor to General Motors Corporation, Dayton, Ohio, a corporation of Delaware No Drawing. Application September 9, 1950,
Serial No. 184,125

4 Claims. (Cl. 113—110)

This invention is related in a general way to chemistry and more particularly to metal bonding materials which may be stored as a dry powder and applied as a liquid by mixing with water. The most extensive use of the invention is in copper brazing and the invention will be described with this use being given primary consideration.

Where it is not practical to use metallic copper or brass for copper or brass brazing, it has been customary to use copper or brass powder suspended in a lacquer as the brazing material. While such lacquer has been widely used and provides satisfactory brazed joints, there are some objections to its composition and use. The lacquer is highly inflammable and is a very objectionable fire hazard during its application and also during drying. It requires considerable storage space since it must be kept in the liquid form. The storage of such lacquer is likewise a fire hazard.

If sufficient oxygen is not present in the furnace, the lacquer will leave a deposit upon the work which is difficult to remove. When the lacquer is applied to the work, there is always some which is misapplied and collects in the place of application. Such lacquer deposits harden and become difficult to dissolve and remove. Such deposits are also difficult to reclaim for reuse or salvage. These difficulties are also present when other metal powders are suspended in lacquers for metal bonding.

It is an object of my invention to provide a metal bonding material which is not inflammable and can be readily stored.

It is another object of my invention to provide a metal bonding material which can be stored in a dry powder form and easily prepared for use in small or large quantities in a few minutes by mixing with a liquid such as water.

It is another object of my invention to provide a metal bonding material which after drying can be readily dissolved in water or other solvents and reclaimed.

Generically my brazing material includes a dry mixture of about 85–99.5% by weight of a metal bonding powder and ½% to 5% by weight of a dry powdered water soluble adhesive both calculated on an anhydrous basis. Where the surfaces of the work to be bonded are not sufficiently clean and do not wet readily, a small amount such as ½% by weight of a wetting agent may be included in the mixture. The mixture is kept stored in this dry powdered condition till ready for use. To make it ready for use, it is mixed in small amounts with water about in the ratio of 10–60% of the total weight of the mixture. The minimum amount of water is used to make a material for application by brushing while a greater amount is used when it is desired to apply the material by pouring or spraying. Also more water is used when a higher proportion of adhesive is used.

After application by any one of these manners, it is desirable that the material be dried before its insertion into the brazing furnace. However, where water vapor in the furnace is not objectionable, the parts to which the bonding material has been applied can be placed directly in the brazing furnace for brazing without drying.

As one specific example of my invention, I make up a dry powder mixture containing the following: 91.5 to 92% copper powder which is 99% pure and of such fineness that 50–70% of the copper powder will pass through a 325 mesh screen, 7% iron oxide of the type known as jeweler's rouge (cosmetic grade), 1% sodium carboxy methyl cellulose and ½% of sodium hydrocarbon sulfonate. The wetting agent, sodium hydrocarbon sulfonate, is optional. Other wetting agents available in a powder form may be used such as the wetting agent known as Aerosol OT which is an ester of a sulfonated bicarboxylic acid.

If desired, the iron oxide may be replaced by iron powder or if the joints are very tight, it may be omitted. It may vary from 0% to 7% according to the character of the joints to be made. However, the presence of the iron or iron oxide powder in the mixture prevents the molten copper from flowing into freely and in particular prevents the molten copper from running out of the desired joint to be made.

The copper powder may vary from 85% to 99.5% by weight. Instead of copper powder, brass powder may be used for some applications and also there may be used powdered metal solders and powdered soldering alloys containing metals such as silver, copper, lead, zinc, antimony and tin in different proportions depending upon the application.

I strongly prefer sodium carboxy methyl cellulose as a water soluble adhesive for this mixture since it does not cake and is readily soluble and makes an excellent adhesive. It may vary from ½% to about 5% by weight. However, if desired, there may be substituted other dry powdered water soluble synthetic adhesives such as potassium carboxy methyl cellulose, hydroxyethyl cellulose, sodium alginate, methyl cellulose, methocelurea formaldehyde, methocel melamine formaldehyde and casein. Animal and vegetable adhesives are less satisfactory because they have lesser adhesive properties and therefore a larger proportion is required. They also require better storage conditions and are more apt to deteriorate. Some examples of this type are gum arabic, gum acacia, gum tragacanth, dry powdered hide glue and gelatin. The material is stored in the dry powder form. This makes storage problems easy since less space is required. The material is not readily inflammable.

For application, the dry powdered material is easily mixed in small amounts with water. The amount of water varies according to the proportion of adhesive in the mixture and the method of application which is to be used. For brushing, sufficient water is mixed with the powder to make a liquid having a consistency similar to house paint. For this purpose, the specific mixture set forth in the specific example above will require 35 parts of water to every 100 parts of the dry mixture measured on a volume basis. For pouring or spraying, about 55 parts of water to every one hundred parts by volume of the specific mixture should be used. By weight, the water percentage for brushing will be about 26% while the water percentage for spraying will be about 35.5%. Considerable variation may be permitted according to variation in the application. In general to cover various percentages of the different materials and their equivalents named, the water percentage may vary from 10% to 60% by weight. This water percentage will vary particularly with the percentage of water soluble adhesive used in the mixture.

I find that the metal bonding material thus described is easily made, readily stored, and is easy to mix on the job. It is readily applied and dried without any fire hazard and sticks readily to the work to which it is applied. It is readily consumed in the brazing furnace during the brazing operation so that no objectionable deposits are formed. The material retains its water solubility on drying. Therefore any material which is misapplied and does not reach the proper place on the work may be removed by washing, brushing or scraping. Any dried material may be easily recovered for reuse by soaking in the proper quantity of water and thereafter stirring the resulting mixture. If desired, any thoroughly dried material may be ground and then mixed with the required amount of water for reuse. Waste is thus minimized.

While the form of embodiment of the invention as herein disclosed, constitutes a preferred form it is to be understood that other forms might be adopted, as may come within the scope of the claims which follow.

What is claimed is as follows:

1. A non-caking readily stored dry copper brazing powder mixture capable of being quickly mixed with water only on the job in small amounts to make a copper brazing paste capable of retaining its water solubility upon drying which includes 85% to 99.5% by weight of copper powder, ½% to 5% by weight of an alkali carboxy methyl cellulose, and 0% to 14% by weight of iron oxide powder.

2. A non-caking readily stored dry copper brazing powder mixture capable of being quickly mixed with water only on the job in small amounts to make a copper brazing paste capable of retaining its water solubility upon drying which includes 95% to 99.5% by weight metal powder containing at least 85% copper, and ½% to 5% by weight of an alkali carboxy methyl cellulose.

3. A non-caking readily stored dry copper brazing powder mixture capable of being quickly mixed with water only on the job in small amounts to make a copper brazing paste capable of retaining its water solubility upon drying which mixture includes about 92% by weight copper powder, about 7% by weight iron oxide powder, and about 1% by weight sodium carboxy methyl cellulose.

4. A copper brazing paste capable of retaining its water solubility upon drying which includes 85% to 99.5% by weight of metal powder having a substantial copper content, ½% to 5% by weight of an alkali carboxy methyl cellulose, 0% to 14% of a powder having a substantial iron content all calculated upon an anhydrous basis, and water in the amount of 10% to 60% by weight of the above materials.

References Cited in the file of this patent

UNITED STATES PATENTS

| | | |
|---|---|---|
| 841,151 | Hornsby | Jan. 15, 1907 |
| 2,288,200 | Meyer | June 30, 1942 |
| 2,507,751 | Bennett | May 16, 1950 |
| 2,550,174 | Towner | Apr. 24, 1951 |
| 2,583,036 | Wolf | Jan. 22, 1952 |
| 2,591,994 | Alexander | Apr. 8, 1952 |
| 2,606,132 | Klinker | Aug. 5, 1952 |

OTHER REFERENCES

Iron Age, Dec. 8, 1938, pp. 48 and 49.